United States Patent

[11] 3,628,491

| [72] | Inventor | William R. Conrad |
| | | 1299 Ashland Ave., Columbus, Ohio 43212 |
| [21] | Appl. No. | 31,173 |
| [22] | Filed | Apr. 23, 1970 |
| [45] | Patented | Dec. 21, 1971 |

[54] WATER-WALKING DEVICE
3 Claims, 4 Drawing Figs.

[52] U.S. Cl............................................................ 115/2,
272/1 B, 115/19
[51] Int. Cl............................................................ B63h 5/00,
B63h 16/00
[50] Field of Search............................................ 272/1 B, 69;
115/1, 19, 2; 416/84

[56] References Cited
UNITED STATES PATENTS
3,223,411 12/1965 Becroft........................... 272/1 B
2,175,197 10/1939 Kent................................ 272/1 B

*Primary Examiner*—Andrew H. Farrell
*Attorney*—Brown, Murray, Flick & Peckham

ABSTRACT: A floating water-walking device has a horizontal cylindrical tread portion joined at its opposite ends to a pair of paddle wheels coaxial with it. Each of the wheels have circumferentially spaced radial vanes and is at least as great in diameter as the tread portion. The latter is large enough to stand on so that if the floating device is rotated by the feet of a person standing on it the paddle wheels will cause it to travel across the water.

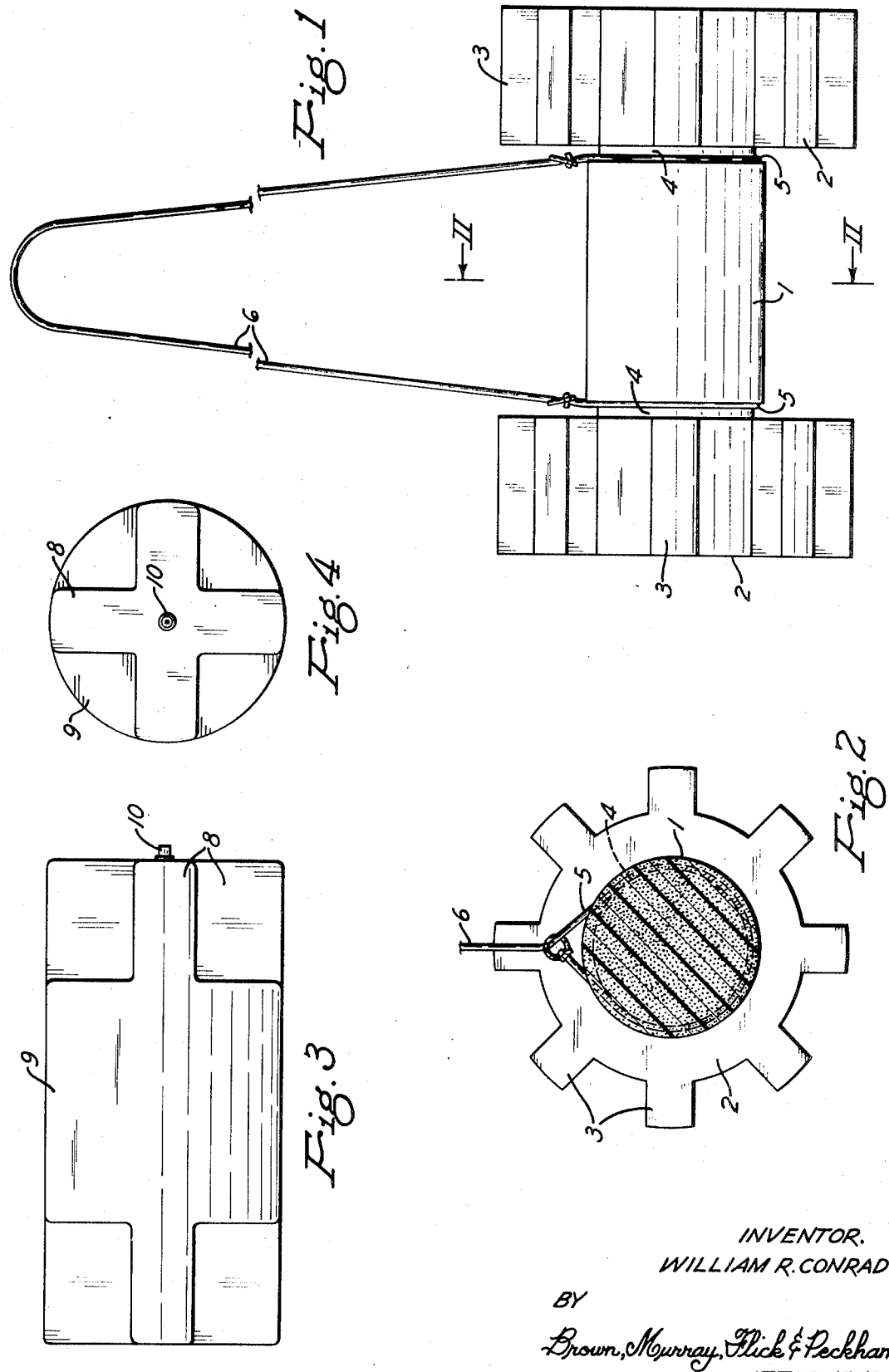
INVENTOR.
WILLIAM R. CONRAD
BY
Brown, Murray, Flick & Peckham
ATTORNEYS.

WATER-WALKING DEVICE

The sport of log rolling in water is engaged in by one or more persons standing on a log and going through the motions of walking on it, which causes it to rotate. Sometimes this is done simply to see how fast the log can be rotated, while at other times when two persons are on the log the object is for one of them to rotate the log in such a manner as to upset the other person and cause him to fall into the water. The logs used in this sport are smooth and generally rotate in one location with little or no lateral movement.

It is among the objects of this invention to provide a log rolling type of device which not only can be rotated by walking or running on it, but which will travel across the water as it rotates.

The invention is illustrated in the accompanying drawings, in which:

FIG. 1 is a side view of my water-walking device;
FIG. 2 is a vertical cross section taken on the line II—II of FIG. 1;
FIG. 3 is a side view of a modification; and
FIG. 4 is an end view thereof.

Referring to FIGS. 1 and 2 of the drawings, the device consists of two parts; a horizontal cylindrical tread portion 1 between two paddle wheels 2. The central tread portion and the paddle wheels can all be made of the same material or the central portion can be made of a different material than the wheels. In any case, the material used must be buoyant enough and the device must be large enough to float in water while supporting a man. Thus, the device may be made from wood or a foam plastic, or it can be made hollow of flexible material and then inflated with air to make it rigid. If desired, the paddle wheels can be solid, such as being made from wood or other buoyant material, and the central tread portion can be inflated. After use the tread portion then could be deflated, which will permit the size of the device to be reduced materially for transportation and storage.

Each of the paddle wheels includes a plurality of circumferentially spaced radial vanes 3. The wheels are larger in diameter than the tread portion between them. Each wheel has parallel circular end walls of greater diameter than the tread portion, and the vanes extend radially outward from those walls.

With this device floating in the water, a person steps onto the tread portion, where he has to balance himself. He then, in effect, walks around the tread portion as on a tread mill and this causes the device to rotate in the water. Due to the paddle wheels, the rotation causes the device to roll or travel across the water. The speed at which the device is propelled across the water will depend upon how fast the person who is rotating it can make it turn without losing his balance and falling into the water.

To add to the sport, the central tread portion 1 may be provided with one or more annular grooves. If one groove is used, it would be at the center of the tread portion. Two grooves 4 are preferred and they are located at its opposite ends, with the inner end walls of the paddle wheels serving as the outer walls of the two grooves. Housed in each groove is a loop 5 of metal, plastic or other suitable material, which fits the tread portion loosely. This may be a flexible endless band, or a loop formed by a noose in a flexible line as shown. A line 6 is connected to each loop. Preferably, the loops are at opposite ends of the same line. The person who is standing on the device holds the line and can exert a restraining force on the device by simply pulling on the line to tighten the two loops around the rotating tread portion. The loops or nooses therefore act somewhat like the brake bands of an automobile. They are especially useful for beginners because by tightening them the device can be prevented from rotating too fast and getting out of control before the users become experienced and skilled. The nooses, if in a fixed open position, also can be used for towing the device behind a boat. In that case, it would be up to the person standing on the device to walk or run on it at such a speed that he would not fall off as the device is rolled through the water by the boat towing it.

In the modification shown in FIGS. 3 and 4, the water walking device is more in the form of a log because its maximum diameter is uniform throughout its length. In this embodiment of the invention the paddle wheels are formed by radial vanes 8 which are joined along one vertical edge to the ends of the cylindrical central tread portion 9 of the device. The outer ends of the vanes are flush with the surface of the tread portion. Such a water walking device is not as bulky as the other one, but it will not travel through the water as fast because the paddle wheels are smaller in diameter relative to the tread portion. In some cases, however, this may be a desirable feature. Here again the device can be made of wood, plastic or the like, but the one shown is rubber and hollow. It was inflated with air through a valve 10 in one end. When deflated, it can be rolled or folded into a compact bundle.

It will be realized that although the devices disclosed herein are intended primarily for use in water, they also can be rolled over the ground by persons walking on them. In fact, a person can mount one of these devices on the shore of a body of water and cause it to roll along the ground and then into the water, thereby changing it from a land vehicle to a water vehicle.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A water-walking device designed to float in a body of water, comprising a horizontal cylindrical tread portion joined at its opposite ends to a pair of paddle wheels coaxial therewith, each of said wheels having circumferentially spaced radial vanes, the diameter of each wheel being at least as great as the diameter of said tread portion, the tread portion being large enough to stand on, whereby if the floating device is rotated by the feet of a person standing on it said paddle wheels will cause it to travel across the water, said tread portion being provided with an annular groove, a loop around the tread portion in said groove, and a line connected to the loop and extending upwardly therefrom and adapted to be pulled by said person to pull the loop tightly against said tread portion, whereby to manually control rotation of said device.

2. A water-walking device according to claim 1, in which said paddle wheels are larger in diameter than said tread portion, and each end of the tread portion is provided with an annular groove having an outer wall formed by the adjoining paddle wheel, said device including a separate loop around the tread portion in each of said grooves, and said line connecting the loops.

3. A water-walking device designed to float in a body of water, comprising a horizontal cylindrical tread portion joined at its opposite ends to a pair of paddle wheels coaxial therewith, each of said wheels having circumferentially spaced radial vanes, the diameter of each wheel being at least as great as the diameter of said tread portion, and the tread portion being large enough to stand on, whereby if the floating device is rotated by the feet of a person standing on it said paddle wheels will cause it to travel across the water, said device being hollow and formed from flexible impervious rubberlike material and provided with a normally closed opening to permit it to be inflated.

* * * * *